UNITED STATES PATENT OFFICE.

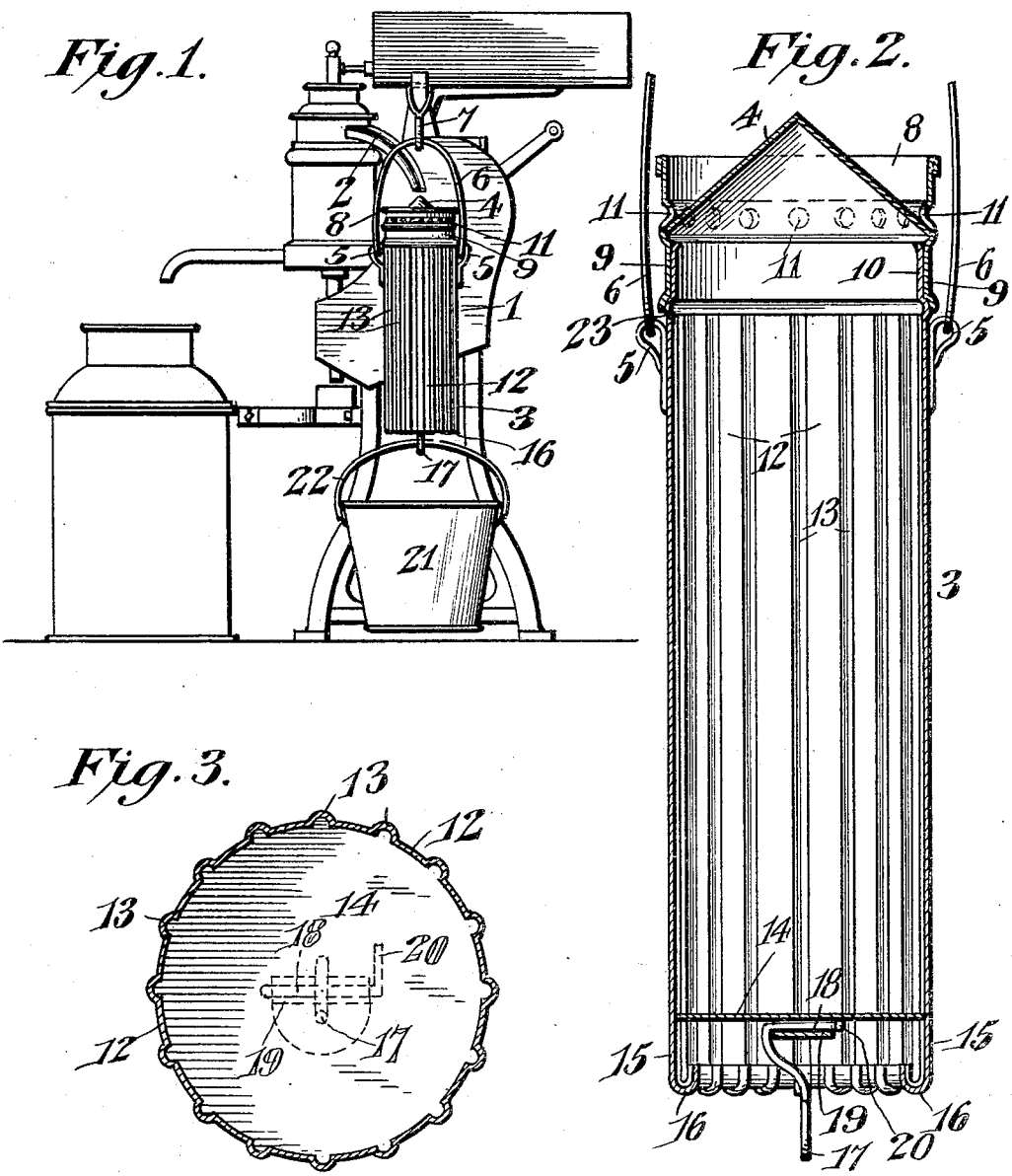

STEPHEN O. RICE, OF SHEDDS, OREGON.

CREAM-COOLER FOR CENTRIFUGAL SEPARATORS.

931,959.

Specification of Letters Patent.

Patented Aug. 24, 1909.

Application filed August 12, 1908. Serial No. 448,211.

*To all whom it may concern:*

Be it known that I, STEPHEN O. RICE, a citizen of the United States, residing at Shedds, in the county of Linn and State of Oregon, have invented a new and useful Cream-Cooler for Centrifugal Separators, of which the following is a specification.

The invention relates to a cream cooler for centrifugal separators.

The object of the present invention is to improve the construction of cream coolers, and to provide a simple, inexpensive and efficient one designed for use in connection with hand operated centrifugal separators, and adapted to immediately cool the cream and aerate it so as to improve its taste and retain its quality.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a cream cooler, constructed in accordance with this invention, and shown applied to a centrifugal separator. Fig. 2 is a vertical sectional view of the cream cooler. Fig. 3 is a horizontal sectional view of the same.

Like numerals of reference designate corresponding parts in all the figures of the drawing.

The cream cooler, which is designed to be suspended at one side of a centrifugal separator 1 in position to receive the cream from the spout 2, consists of a cylindrical receptacle 3, having a conical cover 4. The cylindrical receptacle, which is preferably constructed of sheet metal, is provided at opposite sides with eyes 5 for the reception of a bail 6 for enabling the cream cooler to be hung on a hook 7, or other suitable suspendable device.

The conical cover, which is adapted to spread or distribute the cream to all portions of the cooler, is provided with an upwardly extending flange 8, and a depending flange 9, which fits over the upper portion 10 of the cylindrical receptacle and forms a liquid tight connection between the cover and the receptacle. The upwardly extending flange forms a cylindrical wall and is provided at the base with an annular series of perforations 11, located at the periphery or base of the conical cover and adapted to permit the cream to flow downward on the exterior of the cooler. The upwardly projecting flange forms a chamber or compartment to receive the cream from the spout 2, and the conical cover causes the cream to escape through all of the perforations 11, so that the cream will be thoroughly subjected to the action of the cooler.

The cream cooler is designed to be filled with cold water, or other cooling liquid, and it is provided with longitudinal corrugations forming exterior grooves 12 and intervening ribs or ridges 13. The cream runs down the outside of the cooler in small streams, and the grooves prevent the cream from running together or uniting, thereby subjecting the cream to a maximum cooling action. The body portion of the cylindrical receptacle is extended below the bottom 14 to provide a depending flange 15, which has its lower edge 16 bent upward and inward to avoid catching the cream and retarding the flow of the same from the lower end of the cream cooler.

The cream cooler is equipped at its bottom with a depending hook 17, provided at the top with a horizontal pintle portion 18, arranged in a suitable bearing 19 and having a terminal arm 20 for limiting the swing of the hook in one direction. The hook, which is foldable within the depending flange 15, is adapted to support a pail 21, provided with a bail 22 for engaging the hook 17 and adapted to catch the cream flowing from the cream cooler. The cylindrical receptacle is provided at its upper portion adjacent to the upper ends of the longitudinal corrugations with an annular rib 23, formed by interiorly grooving the receptacle and adapted to stiffen the same.

Having thus fully described my invention, what I claim as new and desire to secure by Letters Patent, is:—

1. A cream cooler for separators including a receptacle designed to contain a cooling liquid, and a conical cover fitted on the receptacle and provided with an upwardly extending annular flange encircling the base of the cone and forming a cream receiving chamber and provided at the base with discharge apertures, the said conical cover forming a distributing device for spreading the cream and the apex of the cover being extended above the upper edges of the flange.

2. A cream cooler for separators including a cylindrical receptacle, a conical cover provided with upwardly and downwardly extending annular flanges, the lower flange engaging the receptacle and the upper flange being provided at the base with discharge apertures, means for suspending the receptacle in position to receive the cream from a separator, and means carried by the bottom of the receptacle for supporting the milk pail or receptacle.

3. A cream cooler for separators including a cylindrical receptacle provided with exterior longitudinal grooves arranged to separate the cream into small streams and increasing the cooling surface, and a cover fitted on the receptacle and having cream receiving means for directing the cream to the grooves, the latter extending from the cover to the lower end of the receptacle.

4. A cream cooler for separators including a receptacle provided at the lower end with a depending flange having an inwardly and upwardly extending lower edge, and a cover fitted on the receptacle and having means for distributing the cream over the receptacle.

5. A cream cooler for separators including a receptacle provided at the bottom with a depending flange, a hook hinged to the bottom and foldable within the flange and having an arm for limiting its swinging movement in one direction, said hook being adapted to suspend a cream pail from the cooler, a cover fitted on the receptacle, and means for suspending the receptacle.

In testimony, that I claim the foregoing as my own, I have hereto affixed my signature in the presence of two witnesses.

STEPHEN O. RICE.

Witnesses:
C. J. SHEDD,
L. ST. JOHN.